Nov. 23, 1943.  F. M. THOMAS ET AL  2,334,967
VARIABLE-PITCH AIRSCREW
Filed March 19, 1942   6 Sheets-Sheet 1

Inventors
F. M. Thomas
D. J. Kenney
and P. R. Price
by Wilkinson & Mawhinney
Attorneys.

Fig. 4.

Inventors
F. M. Thomas
D. J. Kenney
and P. R. Price
by Wilkinson & Mawhinney
Attorneys.

Patented Nov. 23, 1943

2,334,967

UNITED STATES PATENT OFFICE 2,334,967

VARIABLE-PITCH AIRSCREW

Frederick Metcalf Thomas, North Adams, Mass., and Douglas John Kenney and Peter Ralph Price, Bristol, England, assignors to The Bristol Aeroplane Company Limited, Bristol, England, a British company Application March 19, 1942, Serial No. 435,436 In Great Britain April 23, 1941

10 Claims. (Cl. 170—163)

This invention is concerned with airscrews of the type known as "constant-speed variable-pitch airscrews." These comprise a variable-pitch airscrew having in combination therewith a speed-governor which automatically controls the adjustment of the blades so as to maintain the engine-speed constant at a predetermined value. The variations in speed of an engine-driven airscrew arise due to the varying conditions which occur in flight, and the function of the governor is so to adjust the pitch of the airscrew that when a speed-difference arises, the loading of the airscrew on the engine is such as to reduce this difference and thereby maintain the engine-speed constant at the predetermined value. Provision is made for selecting the value at which the speed is to be kept constant. Airscrews having these characteristics are of various types but the invention is concerned with airscrews in which the pitch of the blades is adjusted by means of an electric motor, the operation of which is controlled by the governor opening and closing appropriate contacts in the circuit of the pitch-changing motor. This control, and the contacts by which it is effected will be referred to as the normal control and normal contacts.

Since the governor-controlled device cannot become operative until a variation from the desired constant speed has arisen, there is necessarily a short time-lag in the adjustment, and in the case of aircraft the changes in flight-conditions may occur so rapidly that the rate at which the pitch of the blades is changed in normal governing is not sufficiently fast to enable the speed of rotation of the airscrew and engine to be held constant; for example, during aerobatics or in military operations it is possible with the normal control for temporary speed-variations to reach a value which is dangerous, or at least very undesirable.

According to this invention, there is provided the combination with an electrically-operated constant-speed airscrew, of means for increasing the rate of pitch-change when the difference of speed from the required value exceeds a predetermined amount. This may be effected by control of the field-winding of the motor, either by cutting out a part of it, or by inserting a diverter resistance, but preferably the increased rate of pitch-change is effected by increasing the voltage supply to the motor to cause it to run at a higher speed so that the desired correction of the speed of the installation is much more rapidly effected; this higher rate of pitch-change is applied only when the speed-variation rises above a predetermined value, and is cut off automatically when the pitch-adjustment brings the airscrew-speed within the range of variation at which the lower or normal rate of pitch-change is adequate. A lower normal rate of pitch-change is desirable because it imposes a lesser strain on the electrical equipment, and particularly on the battery, and it also enables greater accuracy to be obtained in the operation.

According to another feature of this invention, it comprises the combination with the governor-unit of an electrically operated constant-speed variable-pitch airscrew, of an additional switch or switches arranged to be operated by displacements of the governor beyond those at which the normal automatic control becomes operative, said switch or switches operating to connect into the circuit of the pitch-changing motor an additional source of electric potential to replace or supplement the normal supply voltage.

Preferably a battery is used to supply the electric power for the normal governing operations, and a power-driven generator is used for the alternative or supplementary electric supply. This generator may be driven by a motor supplied from the battery, or may be independently driven.

According to another feature of the invention, when the generator is independently driven it may be normally connected in parallel with the battery to charge it, and connected in series with the battery when the change in speed of the airscrew exceeds a predetermined amount and the higher supply voltage is required for the pitch-changing motor.

According to yet another feature of the invention, the power-supply may be effected by a battery divided into sections, which sections are connected in parallel for normal governing operations, and in series when the change in speed of the airscrew exceeds a predetermined amount.

According to another feature of this invention, the additional switch or switches aforesaid operate through a relay or relays, a switch or switches which, in addition to controlling the additional or alternative source of electric potential, also operate to cut out the governor-contacts for the normal automatic control.

The relay-operated switch or switches are preferably each a two-position switch, which in one position connects the normal governing contacts in circuit with the pitch-changing motor, and in the other position connects the higher voltage supply with the motor.

According to yet another feature of this invention when it is applied to a known type of electrically-operated constant-speed variable-pitch airscrew in which the normal governor-control is effected by means of oscillating governor-contacts which energise the pitch-changing motor intermittently, during periods which increase in duration with increase of the speed-deviation of the airscrew from the required value, there may be provided a switch operated synchronously with the governor-contacts, which switch connects a higher-voltage supply to the pitch-changing motor when a predetermined duration of the said energising periods is exceeded.

The invention may be applied to various types of electrically-operated constant-speed variable-pitch airscrews, but various embodiments of it as applied to a well-known type of such airscrews will now be described as examples, and the invention also covers these specific arrangements.

In the accompanying drawings.

Like reference characters indicate like parts throughout these drawings.

Figure 1:
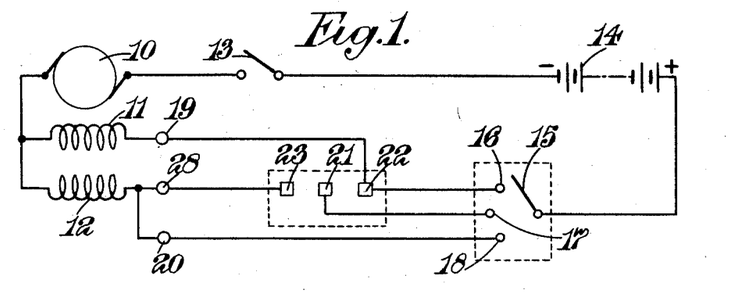
Figure 1 is a simplified circuit diagram of a known type of electrically-operated constant-speed variable-pitch airscrew to which this invention can be applied.

A brief description will first be given of the known arrangement of electrically-operated constant-speed variable-pitch airscrew as illustrated in Figure 1, so that the modification of it introduced by the present invention may be more clearly appreciated.

A series-wound reversible pitch-changing motor is indicated by an armature 10 with field-coils 11 and 12 to give the opposite directions of rotation. One side of the armature is connected through a master-switch 13 to a battery or other source of electrical power 14, and the other side of the armature is connected in series with the two field-coils 11, 12.

A manually-controlled switch 15 is adjustable from an "off" position on to any one of three contacts 16, 17, 18. The contact 16 is connected to the field-coil 11 and the contact 18 is connected to the field-coil 12 so that a direct manual control of the motor 10, 11, 12 is provided by these two positions of the switch 15, the motor continuing to run in one direction or other according to the contact selected so long as the appropriate circuit is closed, or until limit-switches 19, 20 are opened on the blade reaching the permissible limit of its travel. The contact 16 is used when it is desired to adjust the blades to a fine-pitch position, that is to say, when the speed of the engine is too low, and the contact 18 is used to adjust the blades to a coarse-pitch position when the speed of the engine is too high.

The automatic control, to maintain constant speed, is obtained by the contact 17 of the switch 15, this contact being connected to a governor-controlled contact 21 movable between two contacts 22, 23.

Figure 8:
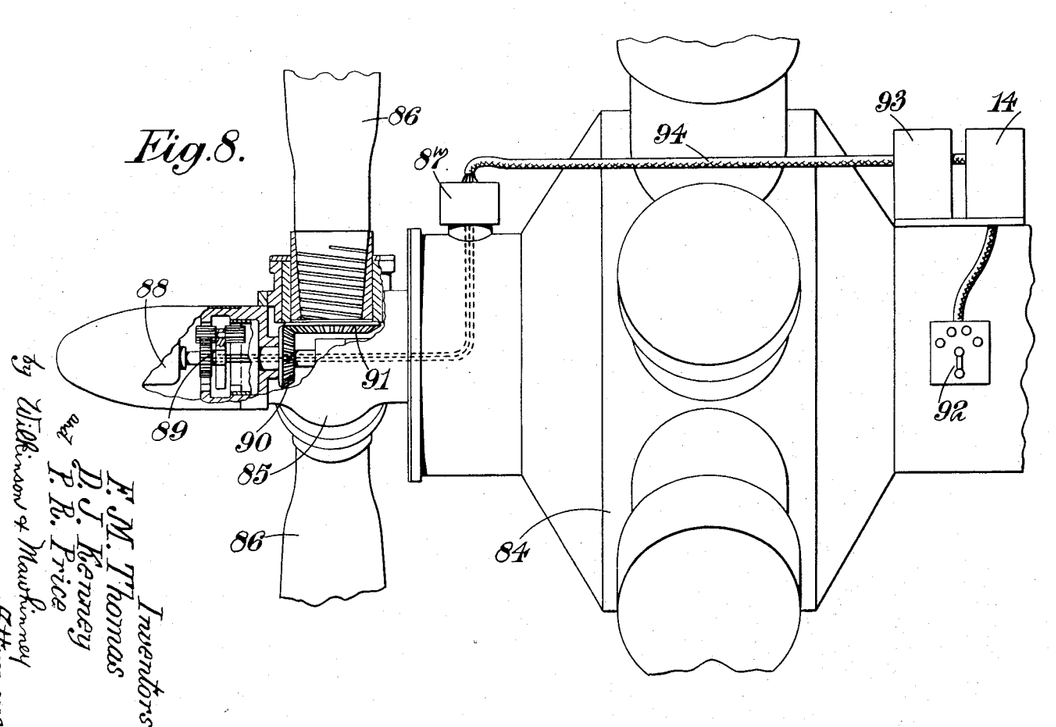
Figure 8 is a diagrammatic view illustrating the complete installation.

Figure 8 illustrates diagrammatically the complete installation, comprising a radial-cylinder engine 84 driving an airscrew 85 whereof the blades 86 are adjustable as to their pitch. The engine-driven governor-unit comprising the contacts 21, 22, 23, and the additional contacts as hereinafter described, is indicated at 87, and the pitch-changing motor 88 is connected through a suitable reducing-gear 89 with a bevel-pinion 90 engaging bevel-wheels 91 secured at the root-end of each of the blades 86. Rotation of the pitch-changing motor 88 in one or other direction adjusts the pitch of the blades 86 as above described. The manual control switch 15 is mounted in a casing 92 conveniently accessible to the pilot of the aircraft, and the battery for normal working is indicated at 14 with the additional or alternative electric supply indicated at 93. The wiring is indicated diagrammatically at 94.

Figure 2:
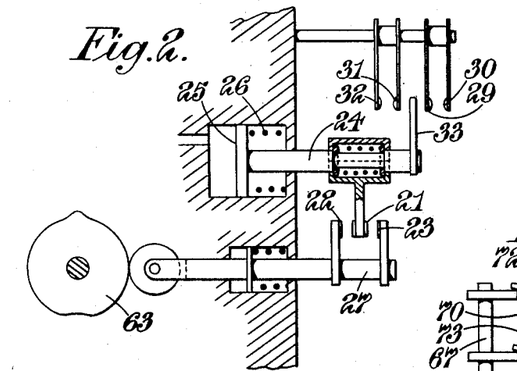
Figure 2 is a diagrammatic representation of the governor-controlled contacts as used in the circuit in Figure 1 and as modified for the purposes of the present invention.

Referring now to Figure 2, the contact 21 is carried on a member 24 which is movable towards the right or left according as the speed of the airscrew is too high or too low. This may be effected in any convenient manner and in the construction diagrammatically illustrated such movement is effected by hydraulic pressure generated by a pump whereof the speed varies with that of the airscrew; this pressure operates on a piston in a chamber 25 against the action of a spring 26. The cooperating contacts 22, 23 might be stationary contacts but in the known arrangement now being described, these contacts are mounted on an element 27 which is given by a cam 63 a reciprocating motion which, however, is not sufficient to bring either of the contacts 22, 23 into engagement with the contact 21 when in its normal mean position. If, however, it is displaced therefrom, it makes contact with one or other of 22, 23 and the duration of such contact is determined by the joint effects of the displacement of the contact 21 due to a speed-variation and the reciprocating movement of the member 27, this arrangement giving a more sensitive control.

The contact 22 is connected through the limit-switch 19 with the field-coil 11 and the contact 23 is similarly connected through a limit-switch 28 with the field-coil 12.

It will be appreciated from the above that, in the automatic speed-control, when the switch 15 is on the contact 17 a circuit is provided therethrough from the battery 14 to the contact 21. If the speed of the air-screw is too high a circuit is completed from 21 through 23, 28, 12, 10, 13 to the battery 14 and the motor is set in operation to move the blades towards their coarse-pitch position. Similarly, if the speed is too low, the alternative circuit is completed from 21 through 22, 19, 11, 10, 13 and the motor rotates in the opposite direction to adjust the blades towards a finer-pitch position. So long as the speed remains at its desired value, the contact 21 remains stationary in its mid-position.

In applying the present invention to the arrangement just described, additional switches are operated by the governor-controlled member 24. As shown in Figure 2, a pair of contacts 29, 30 are adapted to be closed when the speed rises, and a pair of contacts 31, 32 are adapted to be closed when the speed falls. This operation is effected by a finger 33 carried by the member 24 and the arrangement of the parts is such that the operation does not take place unless the movement of the member 24 is somewhat in excess of the movement which is necessary for maintaining continuous contact under normal governing conditions of the contacts 21, 22, 23.

Since the contacts 22, 23 are continuously oscillated, the energising of the pitch-changing motor takes place intermittently unless the displacement of the governor-controlled contact 21 is sufficient to maintain it continuously in engagement with one or other of the contacts 22, 23; such continuous energisation of the motor gives the maximum rate of pitch-change under normal governing conditions, and the additional switches 29, 30 or 31, 32 are brought into operation only when the speed-deviation of the airscrew is greater than gives the maximum normal governing control.

Figure 3:
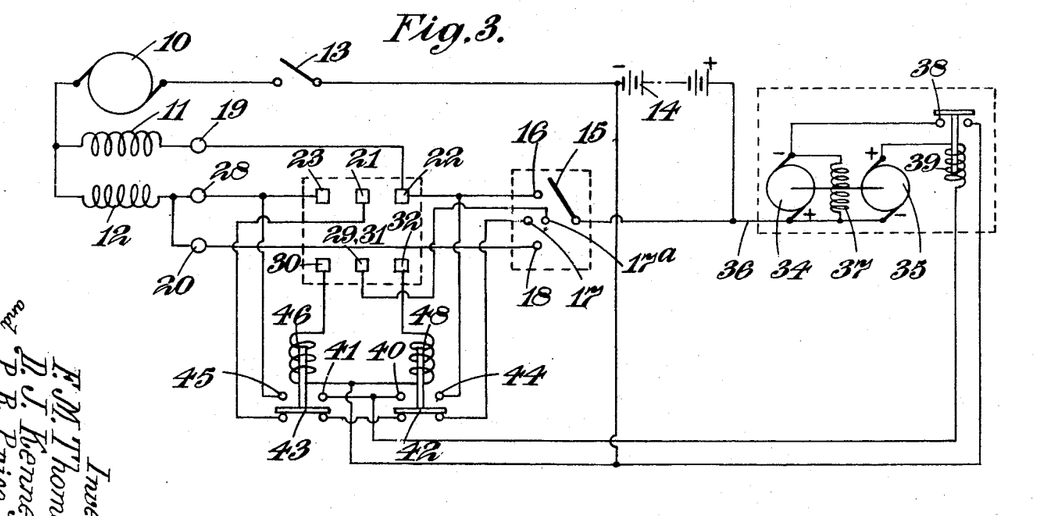
Figures 3, 4 and 5 are simplified circuit diagrams of various arrangements according to the present invention.

Referring now to Figure 3, which illustrates the circuit diagram for one arrangement according to the present invention, the whole of the circuits shown in Figure 1 are used for the normal governing operation, with the following additions. A motor-generator, whereof the motor-element is shown at 34 and the generator at 35, has the motor connected in circuit with the battery 14 by the line 36, through the armature and shunt-field-winding 37 and through an electromagnetically-controlled switch 38 to the other side of the battery by the line 47. The generator 35 has its negative terminal connected by the line 36 to the positive pole of the battery and its positive terminal is connected through the solenoid 39 controlling the switch 38 to a pair of contacts 40, 41. These contacts are adapted to be connected, respectively, through contact-members 42, 43 with contacts 44, 45, respectively, which, in turn, are connected to the governor-controlled contacts 22, 23 (see also Figure 1).

The additional governor-controlled contacts shown in Figure 2 at 29, 30 and 31, 32 are here shown with the contacts 29, 31 merged together to engage alternatively the contacts 30 and 32, and a construction more in accordance with this can be used instead of that shown in Figure 2, and these contacts are arranged in a circuit from the battery 14, as follows: From an auxiliary contact 17a of the switch 15 (which is engaged at the same time as the contact 17 of Figure 1) to the contact 29, 31, with alternative circuits therefrom, either by the contact 30 through a solenoid 46 and thence back by the line 47 to the battery, or by the contact 32 through the solenoid 48 and thence back by the line 47 to the battery. These two solenoids 46, 48 operate the contact-members 42, 43 aforesaid, moving them on to their co-operating contacts 40, 44 or 41, 45 as one or other solenoid is energised. When these solenoids are not energised, the contact-members 42, 43 complete a circuit from the contact 17 of the switch 15 to the movable contact 21 (see also Figure 1) of the normal governing operation.

In the operation of these devices, so long as the speed-variations are small, the automatic control is effected by the contact 21 moving between the contacts 22, 23 and the system is identical with that described in Figure 1. When, however, a larger speed-variation occurs, the governing-element 24 moves sufficiently far for the contact 29, 31 to engage one or other of the contacts 30, 32. If, for example, the speed is too high by an excessive amount, the circuit is completed through the contact 30 as follows: From the positive end of the battery through the switch 15, contact 17a, contact 29, 31, contact 30, solenoid 46 and line 47 to the negative pole of the battery. The solenoid 46 is thereby energised and the contact-member 43 moved on to the contacts 41, 45. The circuit to the governor-contact 21 is thereby opened and the normal operation of the governor suspended, but a circuit is now completed at the contacts 41, 45. This circuit is as follows: From the positive pole of the battery by the line 36 to the negative side of the generator 35, from the positive side of the generator through the coil 39 to the contacts 41, 45, field-winding 12, and armature 10 to the negative pole of the battery. This energises the coil 39 so that the switch 38 is closed to complete the circuit of the motor 34, with the battery 14, which was described above. The motor-generator, therefore, starts up and since the generator is connected in series with the battery 14, the voltage applied to the pitch-changing motor 10, 11, 12 is higher than that for normal operation. In practice, the battery 14 may be a 24-volt battery as ordinarily used on aircraft, and the generator 35 may provide an additional 72 volts, so that the total voltage supplied to the pitch-changing motor 10 is 96 instead of 24; this causes the rate of pitch-change to increase to several times the normal value.

As soon as the speed of the airscrew and engine has been brought down to the range which is covered by the normal operation of the governor, the circuit is broken at the contact 30 and governing operations at normal voltage are resumed.

Similarly, if the speed falls by an excessive amount, a circuit is completed through the contact 32, which energises the solenoid 48 to operate the contact-member 42. This operation need not be described again in detail since it is exactly similar to that already described.

Figure 4:
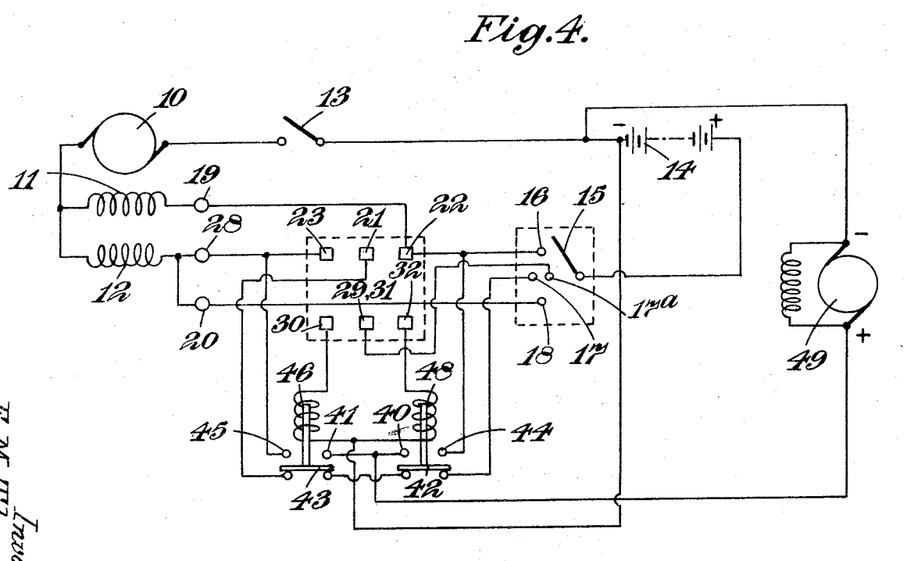

Figure 4 illustrates a modified arrangement of the invention. Instead of using a motor-generator which is driven from the battery, a separate generator of a suitably high voltage driven in any convenient manner may be used, being substituted for the battery instead of being put in series with it. The normal governing circuits are exactly the same as illustrated in Figures 1 and 3, and the control circuits for excess speed-variations are all similar to those illustrated in Figure 3. The high-voltage generator 49 has its negative pole connected to the motor 10, as is the negative pole of the battery, and its positive pole connected to the two contacts 40, 41. The operation of this device need not be described in detail since it is exactly the same as that shown in Figure 3, it being necessary to mention only that the movement of either of the contact-members 42, 43 opens the circuit of the normal governor-control, which is the battery circuit, and connects the positive pole of the generator 49 to one or other of the contacts 22, 23 and thence to the appropriate field-winding of the pitch-changing motor.

Figure 5:
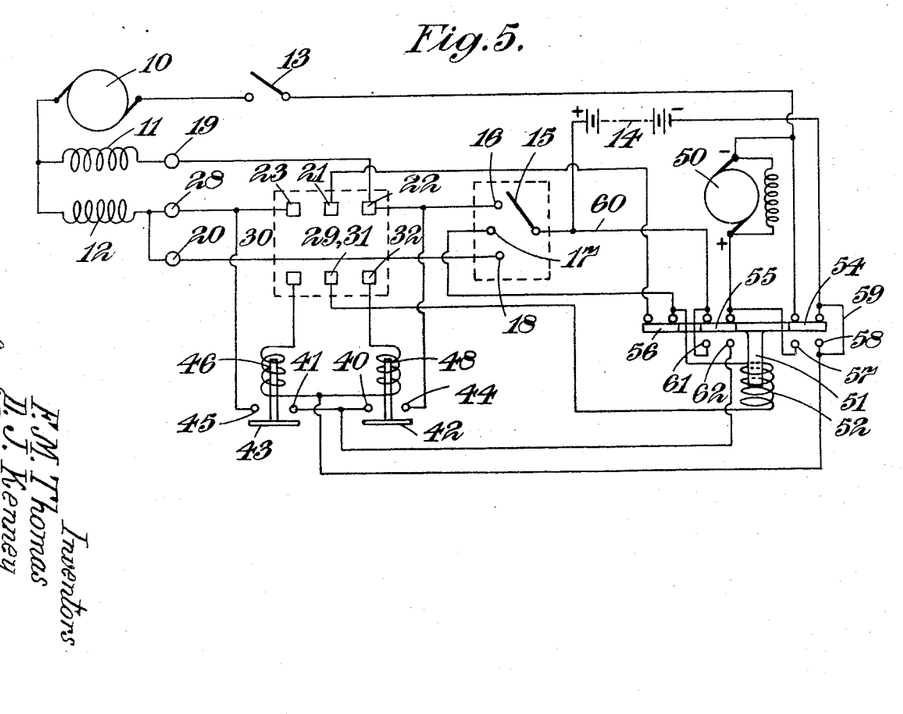

In the modified arrangement illustrated in Figure 5, a separately driven generator 50 of the same voltage as the battery 14 is arranged to be in parallel therewith for normal governing operations, but to be placed in series therewith when the high-speed operation of the blades is required.

The normal governing operation and circuits are the same as in Figure 1, and the auxiliary governor-operated contacts are similar to those shown in Figures 3 and 4 except that the contact-members 42 and 43 control only the circuits through the contacts 40, 44 and 41, 45, but the operation of these members 42, 43 by their solenoids is exactly the same.

An auxiliary switch 51 operated by a solenoid 52 carries three contact-members 54, 55, 56 which effect the switching operations to place the generator in parallel or in series with the battery 14. The solenoid 52 is connected between the contact 17 and the auxiliary contact 29, 31 of the governor-mechanism so that when a circuit is completed through either of the contacts 30, 32 to energise one or other of the coils 46, 48, the switch 51 is also operated.

With the switch 51 in the position shown in Figure 5, the generator 50 is connected in parallel with the battery, the positive poles being connected through the contact 55 and the negative poles being connected through the contact 54 of the switch 51. When an excessive speed-variation arises, and one or other of the coils 46, 48 is energised in the manner above-described, the switch 51 is moved to its lower position and the circuit supplying the motor 10 is as follows: From its negative side through the switch 13 to the negative pole of the generator 50, through the generator to the contact 57, contact-member 54, contact 58 and thence by the line 59 to the negative pole of the battery, through the battery and by the line 60 to the contact 61, contact-member 55, contact 62 to one or other of the contacts 40, 41, one of which is, as in the previously described arrangements, connected to one or other of the contacts 22, 23 respectively, and thence to the other side of the motor.

The advantage of this arrangement is that the generator 50, being in parallel with the battery 14 during all normal working and normal governing operations, keeps the battery charged, but when high-speed operation is required, the voltage applied to the motor 10 can be doubled. Instead of using the generator 50, it is obviously possible to use a second battery, so that the two sections are in parallel or in series as required, and if a still higher voltage is required any appropriate number of sections of the battery could be used, being all placed in parallel for normal operation or in series for high-voltage operation, by providing additional contacts on the switch 51, the additional contacts being arranged similarly to those shown.

Figure 6:
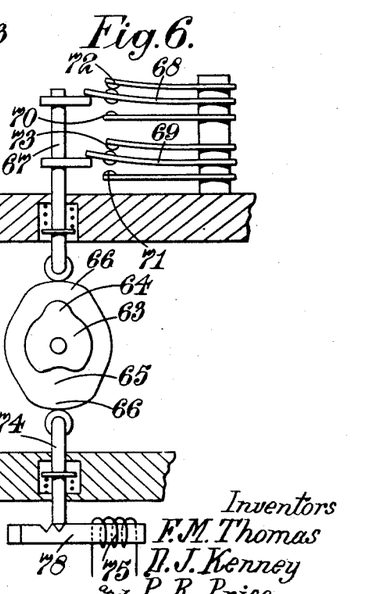
Figure 6 shows diagrammatically a modified form of governor-control.
Figure 7:
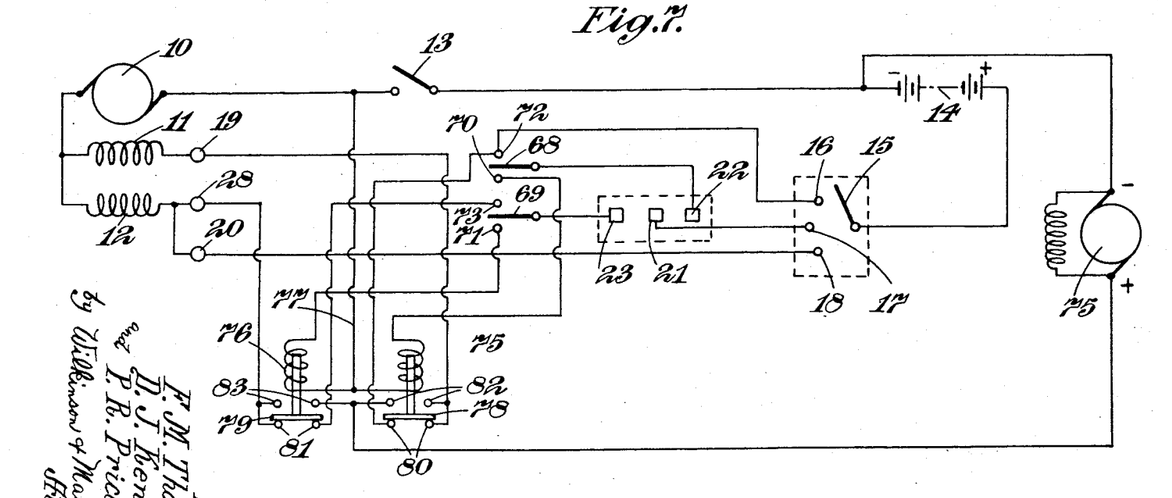
Figure 7 is a circuit diagram illustrating the use of the governor-control shown in Figure 6.

The various arrangements so far described all involve the use of additional contacts on the governor for controlling the high-voltage circuit; if this is not convenient in any particular circumstances, the arrangement illustrated in Figures 6 and 7 may be used, in which a mechanical control is provided for the high-voltage circuit.

This arrangement is used in conjunction with the particular form of governor described above in which the "stationary" contacts of the governor are given a small reciprocating movement, and the cam which effects this reciprocating movement is indicated at 63 in Figure 6, its association with the governor-contacts being illustrated in Figure 2. This cam, which is driven in any convenient manner by the engine, has a lobe 64 which effects movement of the contacts in one direction and a corresponding hollow spaced away 180° to move them in the other direction; during normal governing operations with a small speed variation, the governor-circuit is completed only during the angular extent of the lobe 64 or the corresponding hollow, but if there is an excessive speed-variation, the contact is maintained over a longer period, sometimes continuously, and it is in these conditions that the present invention becomes operative.

There is associated with the cam 63 another two-lobed cam 65 which is driven synchronously and in phase with the cam 63, both being driven from the engine. In Figure 6 the two cams 63, 65 are shown on the same shaft but they would not necessarily be so arranged in practice. The requirement of these cams is that the lobes 66 of the cam 65 should be in phase with, i. e., operative at the same time as, the lobe 64, and the corresponding hollow of the cam 63, and that they should be of greater angular extent. The cam 65 operates a pair of two-way switches by means of the cam-follower 7 which lifts two movable contacts 68, 69 away from contacts 70, 71, respectively, to engage other contacts 72, 73, respectively, and the phase relationship of the cams is such that the lifting of the contacts 68, 69 occurs with the inward movements of the governor-contacts 22, 23. The cam 65 is arranged also to operate, synchronously with the follower 67, a pair of spring-controlled detent-members 74, whereof the function will be described below.

The circuit diagram of this arrangement is shown in Figure 7 and for the purposes of normal governing it includes the battery 14, switch 15, governor-controlled contact 21 with its co-operating contacts 22, 23, pitch-changing motor 10, 11, 12, limit-switches 19, 20, 28 and main switch 13, as in Figure 1. A high-voltage generator 95, gives a supply, alternative to the battery 14, when high-speed operation of the motor 10 is required, and the circuits are arranged in the following way.

Two solenoids 75, 76 operate switches 78, 79 respectively, of which the switch 78 normally closes a pair of contacts 80, but when energised opens these contacts and closes a pair 82. The switch 79 similarly controls two pairs of contacts 81, 83. The contacts 80, 81 are arranged in circuits from the contacts 72, 73 to the field-windings 11, 12, respectively, and the contacts 82, 83 are arranged in circuits from the high-voltage generator 95 to the field-windings 11, 12. The contacts 70, 71 are connected respectively to the solenoids 75, 76 and back by the line 77 to the battery negative so that a circuit can be completed to energise from the battery one or other of the solenoids when the switches 68, 69 move down, if the governor-controlled contact 21 is at that time engaging either of the contacts 22, 23.

As stated above, the movement of the switches 68, 69 is synchronised with that of the governor-contacts 22, 23, so that the solenoid-circuits are completed only when the speed-variation to be corrected is so large that a long or even continuous contact is maintained between 21 and either 22 or 23. The energising of either solenoid operates its switch to complete a circuit from the high-voltage generator 95 to the motor 10.

The contacts 22, 23 of the governor are connected respectively to the switches 68, 69 of Figure 6 and the co-operating contacts 72, 73 of these switches are connected through the contacts 80, 81, respectively, to the two field-windings 11, 12 of the motor. Therefore, when the switches 68, 69 are in their upper position engaging the contacts 72, 73, respectively, the normal governing control, as in Figure 1, can operate, since the governor-contacts 22, 23 make their intermittent contact with 21, whilst the switches 68, 69 are in their upper position. The cams 63 and 65 in Figure 6 are shown in the position in which normal governing is effected and since, for normal governing, the circuit will be broken by the governor-contact, operated by the cam 63, within the angular extent of the lobe 64, the movement of the switches 68, 69 away from the contacts 72, 73, respectively, will not affect the governing operation since it takes place after the governing circuit is broken.

The operation of this arrangement may now be briefly summarized. The switches 68, 69 are moved up and down synchronously with the movement of the contacts 22, 23 of the governor, the conditions being such that these switches are on their upper contacts 72, 73 when one or other of the governor-contacts 22, 23 has been moved towards the contact 21. If a small speed-variation has to be corrected, the governor-circuit is completed during this period and the normal routine of the governor-control is followed, that is to say, the motor 10 receives intermittent impulses in one direction or other until the desired correction of speed has been effected. If, however, the speed-variation is large, being say too low, the governor-contact, between 21 and 22, is not broken when the switches 68, 69 are moved downwards. When these switches reach their contacts 70, 71, a circuit is completed from the positive pole of the battery 14, through the switch 15, contact 17, governor-contacts 21, 22, switch 68, contact 70, solenoid 75 and thence to the battery negative, thereby energising this solenoid. The contact-member 78 is thereby lifted to close the contacts 82, thereby completing a circuit from the positive pole of the generator 95 through the field-coil 11 and armature 10 back to the negative pole of the generator, thereby applying the high voltage to the motor to rotate it at the desired high speed. Similarly, if the speed is excessively high, the governor-controlled contact 21 is engaging 23, the solenoid 76 is energised and the motor 10 is driven in the opposite direction by the high-voltage generator 95. In order to prevent the circuit from the generator 95 being broken when the switches 68, 69 are next moved, and the solenoid circuits broken, the detent-member 74 operated by the cam 65 locks the contact-member 78 (or 79, as the case may be) before the governor-contacts 22, 23 depart from their datum-position. This arrangement ensures that cut-in and cut-out of the high voltage can occur only when the governor-contacts are in their datum-position; the high voltage is, therefore, applied continuously until the speed-variation has been reduced to an amount which can be dealt with by the normal governing action.

We claim:

1. The combination of an airscrew having blades whereof the pitch is adjustable, an electric motor coupled to said blades to vary their pitch, an engine driving said airscrew, a speed-sensitive device also driven by said engine, electrical switches controlled by said device, a source of electrical energy, means for connecting it to said motor through said switches to maintain the engine-speed constant, additional electrical contacts operated by said device, an additional source of electric potential, and means to connect it into the circuit of the pitch-changing motor through said contacts when the engine-speed departs from the predetermined speed by more than a predetermined amount.

2. The combination of an airscrew having blades whereof the pitch is adjustable, an electric motor coupled to said blades to vary their pitch, an engine driving said airscrew, a speed-sensitive device also driven by said engine, electrical switches operated by small displacements of said device, additional electrical contacts operated by greater displacements of said device, a battery connected to said motor through said switches to maintain the engine-speed constant at a predetermined value and a power-driven generator connected in series with said battery by the operation of said electrical contacts.

3. The combination of an airscrew having blades whereof the pitch is adjustable, an electric motor coupled to said blades to vary their pitch, an engine driving said airscrew, a speed-sensitive device also driven by said engine, electrical switches operated by small displacements of said device, additional electrical contacts operated by greater displacements of said device, a battery connected to said motor through said switches to maintain the engine-speed constant at a predetermined value, a power-driven generator of substantially greater voltage than said battery, and circuits controlled by said electrical contacts to disconnect said battery from and connect said generator to said motor.

4. The combination of an airscrew having blades whereof the pitch is adjustable, an electric motor coupled to said blades to vary their pitch, an engine driving said airscrew, a speed-sensitive device also driven by said engine, electrical switches operated by small displacements of said device, a source of electrical energy, means connecting it to said motor through said switches to maintain the engine-speed constant, additional electrical contacts operated by greater displacements of said device, a generator, a driving motor coupled to said generator, circuits connecting said driving motor to said source of electrical energy controlled by said electrical contacts, and circuits connecting said generator in series with said source of electrical energy also controlled by said electrical contacts.

5. The combination of an airscrew having blades whereof the pitch is adjustable, an electric motor coupled to said blades to vary their pitch, an engine driving said airscrew, a speed-sensitive device also driven by said engine, electrical switches operated by small displacements of said device, additional electrical contacts operated by greater displacements of said device, a battery connected to said motor through said switches to maintain the engine-speed constant at a predetermined value, additional electrical contacts operated by greater displacements of said device, an independently driven electrical generator normally connected in parallel with said battery to charge it, and circuits operated by said electrical contacts to connect said generator in series with said battery.

6. The combination of an airscrew having blades whereof the pitch is adjustable, an electric motor coupled to said blades to vary their pitch, an engine driving said airscrew, a speed-sensitive device also driven by said engine, electrical switches operated by small displacements of said device, a storage battery having sections connected in parallel, means for connecting it to said motor through said switches to maintain the engine-speed at a predetermined value, additional electrical contacts operated by greater displacements of said device, circuits controlled by said contacts to connect to said motor said battery-sections in series instead of in parallel.

7. The combination of an airscrew having blades whereof the pitch is adjustable, an electric motor coupled to said blades to vary their pitch, an engine driving said airscrew, a speed-sensitive device also driven by said engine, electrical switches operated by small displacements of said device, additional electrical switches operated by greater displacements of said device, a battery connected to said motor through said first-named switches to maintain the engine-speed constant at a predetermined value, means for supplying a higher voltage than said battery, relay-operated two-position switches controlled by said additional switches, said relay-operated switches constructed and arranged to in one position connect said battery to said motor and in the other position connect said higher voltage supply to said motor.

8. The combination of an airscrew having blades whereof the pitch is adjustable, an electric motor coupled to said blades to vary their pitch, an engine driving said airscrew, a speed-sensitive device also driven by said engine, electrical switches operated by displacement of said device, a source of electrical energy, means for connecting said source through said switches to said motor during periods which increase in duration with increase of the speed-deviation of the airscrew from the desired value to maintain the engine-speed at a predetermined value, means for relatively moving said connecting means to interrupt the supply of current passing through said connecting means, further switches operated synchronously with said switches, a source of higher-voltage-electrical-supply and means connecting said supply to said motor when a predetermined duration of said motor-energising periods is exceeded.

9. The combination of an airscrew having blades whereof the pitch is adjustable, an electric motor coupled to said blades to vary their pitch, an engine driving said airscrew, a speed-sensitive device also driven by said engine, electrical switches operated by displacement of said device, a source of electrical energy, means for connecting said source to said motor during periods which increase in duration with increase of the speed-deviation of the airscrew from the desired value to maintain the engine-speed at a predetermined value, means for relatively moving said connecting means to interrupt the supply of current passing through said connecting means, further switches operated synchronously with said switches between two positions, in one of which they connect said first-mentioned switches to said motor, relay-operated switches energised by said further switches when in their second position, a source of high voltage electrical supply and means connecting it through said relay-operated switches to said motor when a predetermined duration of the motor-energising periods is exceeded.

10. The combination of an airscrew having blades whereof the pitch is adjustable, an electric motor coupled to said blades to vary their pitch, an engine driving said airscrew, a speed-sensitive device also driven by said engine, an electrical switch operated by displacement of said device, a source of electrical energy, means for connecting said source to said motor during periods which increase in duration with increase of the speed-deviation of the airscrew from the desired value to maintain the engine-speed at a predetermined value, means for relatively moving said connecting means to interrupt the supply of current passing through said connecting means, further switches operated synchronously with said switches between two positions, in one of which they connect said first-mentioned switches to said motor, relay-operated switches energised by said further switches when in their second position, a source of high-voltage-electrical-supply, means connecting it through said relay-operated switches to said motor when a predetermined duration of the motor energising periods is exceeded, and a detent to hold said relay-operated switches against opening movement except when the first-mentioned switches are open.

FREDERICK METCALF THOMAS.
DOUGLAS JOHN KENNEY.
PETER RALPH PRICE.